United States Patent
Zeng (10) Patent No.: US 6,708,193 B1
(45) Date of Patent: Mar. 16, 2004

(54) LINEAR SUMMATION MULTIPLIER ARRAY IMPLEMENTATION FOR BOTH SIGNED AND UNSIGNED MULTIPLICATION

(75) Inventor: Richard B Zeng, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/510,274

(22) Filed: Feb. 21, 2000

(51) Int. Cl.$^7$ ................................................. G06F 7/52
(52) U.S. Cl. ........................................ 708/625; 708/620
(58) Field of Search .................................. 708/625, 628, 708/627, 210, 211, 212, 620–632; 382/250

(56) References Cited

U.S. PATENT DOCUMENTS

| | | | | |
|---|---|---|---|---|
| 4,495,593 A | * | 1/1985 | Ware | 708/625 |
| 4,796,219 A | * | 1/1989 | Williams | 708/626 |
| 4,989,168 A | * | 1/1991 | Kuroda et al. | 708/625 |
| 5,121,352 A | * | 6/1992 | Hesson | 708/625 |
| 5,303,176 A | * | 4/1994 | Hrusecky et al. | 708/627 |
| 5,734,599 A | * | 3/1998 | Lee et al. | 708/210 |
| 5,854,757 A | * | 12/1998 | Dierke | 382/250 |
| 6,029,187 A | * | 2/2000 | Verbauwhede | 708/625 |
| 6,366,944 B1 | * | 4/2002 | Hossain et al. | 708/628 |

FOREIGN PATENT DOCUMENTS

EP 0318957 A2 6/1989

OTHER PUBLICATIONS

Larsson–Edefors P. et al., Most Significant Bit First Serial/Parallel Multipliers, Aug. 1998, IEEE Proc–Circuits Devices Systems, vol. 145 No. 4, p. 278–284.*

Janardhan H. Satyanarayana et al., Systematic Analysis of Bounds on Power Consumption in Pipelined and Non–pipelined Multipliers, 1996, IEEE, p. 492–499.*

Sayak S. S. et al., High Throughput VLSI Implementation of Discrete Orthogonal Transforms Using Bit–Level Vector–Matrix Multiplier, May 1999, IEEE Transactions on Circuits and Systems–II: Analog and Digital Signal Processing, vol. 46 No. 5, p. 655–658.*

Sunder S. et al., Two's Complement Fast Serial/Parallel Multiplier, Feb. 1995, IEEE Proc. Circuits Devices Systems, vol. 142 No. 1, p. 41–44.*

United Kingdom Search Report for Application No. GB 0104187.0, Dec. 3, 2001.

* cited by examiner

Primary Examiner—Chuong Dinh Ngo
Assistant Examiner—Chat C. Do (57) ABSTRACT

A system and method are disclosed which provide a multiplier comprising a linear summation array that is implemented in a manner that enables both signed and unsigned multiplication to be performed. A preferred embodiment utilizes a modified Baugh-Wooley algorithm to enable an optimum even-and-odd linear summation array for performing both signed and unsigned high speed multiplication. That is, a preferred embodiment enables a linear summation array that is smaller in size and simpler in design than the multiplier arrays typically implemented for signed multiplication in the prior art. The modified Baugh-Wooley algorithm of a preferred embodiment translates a signed operand to an unsigned operand to greatly simplify the sign extension for multiplication, and to enable a relatively small multiplier array that does not include sign extension columns to be utilized for performing signed multiplication. The modified Baugh-Wooley algorithm of a preferred embodiment also enables the multiplier to perform unsigned multiplication.

5 Claims, 8 Drawing Sheets

$$A = S_A * (-1) * 2^{N-1} + \sum_{i=0}^{N-2} a_i * 2^i = S_A * (-1) * 2^{N-1} + A'$$

$$B = S_B * (-1) * 2^{N-1} + \sum_{i=0}^{N-2} b_i * 2^i = S_B * (-1) * 2^{N-1} + B'$$

$$PRODUCT = A*B = (S_A*(-1)*2^{N-1}+A')*(S_B*(-1)*2^{N-1}+B')$$

$$= \underbrace{S_A*S_B*2^{2N-2}}_{\text{CORNER CELL}} + \underbrace{S_A*(-1)*2^{N-1}*B'}_{\text{A SIGN}*B'} + \underbrace{S_B*(-1)*2^{N-1}*A'}_{\text{B SIGN}*A'} + \underbrace{A'*B'}_{\text{ARRAY CORE}}$$

$$A = S_A*(-1)*2^{N-1} + \sum_{i=0}^{N-2} a_i*2^i = S_A*(-1)*2^{N-1} + A'$$

$$B = S_B*(-1)*2^{N-1} + \sum_{i=0}^{N-2} b_i*2^i = S_B*(-1)*2^{N-1} + B'$$

$$\text{PRODUCT} = A*B = (S_A*(-1)*2^{N-1}+A')*(S_B*(-1)*2^{N-1}+B')$$

$$= \underbrace{S_A*S_B*2^{2N-2}}_{\text{CORNER CELL}} + \underbrace{S_A*(-1)*2^{N-1}*B'}_{\text{A SIGN} * B'} + \underbrace{S_B*(-1)*2^{N-1}*A'}_{\text{B SIGN} * A'} + \underbrace{A'*B'}_{\text{ARRAY CORE}}$$

LINEAR SUMMATION MULTIPLIER ARRAY IMPLEMENTATION FOR BOTH SIGNED AND UNSIGNED MULTIPLICATION

RELATED APPLICATIONS

This application is related to commonly assigned U.S. application Ser. No. 09/510,271 entitled "SYSTEM AND METHOD FOR PERFORMING POPCOUNT USING A MULTIPLIER," filed Feb. 21, 2000 (application abandoned Feb. 26, 2002), the disclosure of which is hereby incorporated herein by reference.

TECHNICAL FIELD

This invention relates in general to multipliers, and in specific to a multiplier that comprises a linear summation array for performing both signed and unsigned multiplication using a modified Baugh-Wooley algorithm.

BACKGROUND

Circuitry for multiplying two or more operands is commonly implemented within many electronic circuits of the prior art. For example, microprocessors typically include some type of multiplier circuitry. In prior art multipliers, the well-known "Booth" encoding algorithm is commonly implemented for performing signed and unsigned multiplication. However, the Booth encoding algorithm is a dynamic solution. High-speed multipliers are commonly implemented with "Booth" encoding dynamic circuitry to meet the high frequency goals (such as for a 1 GHz microprocessor). Generally, a dynamic multiplier consumes more power, adds significant clock load, and requires much more design effort to implement and verify electrical reliability than is required for a static multiplier design. The dynamic Booth encoding algorithm of prior art multipliers generally requires a complex multiplexer ("MUX") structure to be implemented to encode input operands before the partial products of the operands form a multiplier array. The "Booth" encoding MUXes are utilized to minimize the number of partial products for the multiplier. Additionally, all the encoding lines of prior art Booth encoding multipliers are typically very complex and heavy loaded. A multiplier utilizing a Booth encoding algorithm is a standard, well-known implementation for multipliers of the prior art, and therefore is discussed only briefly hereafter.

Figure 1:
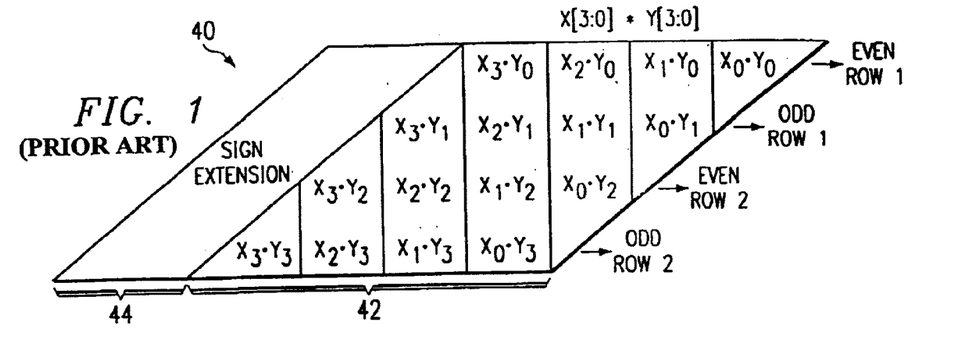
FIG. 1 shows an exemplary multiplier array that results from the multiplication of operands X[3:0] and Y[3:0]

Generally, a multiplier array is utilized within the Booth encoding algorithm to accomplish multiplication. As a simple example, shown in FIG. 1 is a multiplier array 40 that results from the multiplication of operands X[3:0] and Y[3:0]. As shown, the multiplier array of FIG. 1 includes the partial product elements 42 of the operands and a sign extension 44 for signed mutliplication. As is well known in the art, a multiplier typically includes circuitry to AND each element 42 of the multiplier array 40, such as element $X_0*Y_0$, to produce a partial product (e.g., the product of $X_0*Y_0$). The partial products of the multiplier array 40 are then input to a CSA array included within the multiplier to generate the final results (i.e., the final sum output and final carry output). The final output for multiplication (i.e., the product of the two operands) is then generated by summing the final sum and carry in an adder. The Booth algorithm is commonly used in prior art multipliers to achieve high speed, parallel multiplication.

Figure 2A:
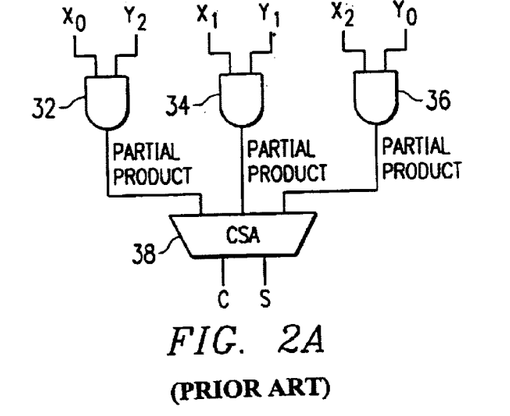
FIG. 2A shows circuitry for generating the partial products of a multiplier array and inputting such partial products to a CSA array to generate a final sum and final carry.
Figure 2B:
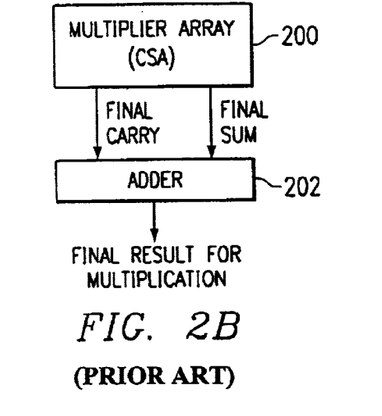
FIG. 2B shows circuitry for generating output of a multiplier.

A linear summation multiplier uses a CSA array directly, without Booth encoding. For example, as shown in FIG. 2A, AND gates, such as AND gates 32, 34, and 36 may be included within a multiplier to each receive an input bit from X[3:0] and from Y[3:0] to produce an element of the multiplier array 40 as input. For instance, AND gate 36 may receive $X_2$ and $Y_0$ as input to produce the partial product for element $X_2*Y_0$ of multiplier array 40 as its output. Similarly, AND gate 34 may receive $X_1$ and $Y_1$ as input to produce the partial product for element $X_1*Y_1$ of multiplier array 40 as its output. Likewise, AND gate 32 may receive $X_0$ and $Y_2$ as input to produce the partial product for element $X_0*Y_2$ of multiplier array 40 as its output. Of course, additional AND gates may be included within a multiplier to produce the partial products for all of the elements of multiplier array 40 in a like manner. As shown in FIG. 2A, the partial products are fed to a CSA array of the multiplier, including CSAs such as CSA 38, to sum the partial products to generate the final sum and final carry. Once the final sum and final carry are generated by the CSA array, they are added to produce the final product to be output by the multiplier. For example, as shown in FIG. 2B, a linear summation multiplier consists of two components, a multiplier CSA array 200 and an adder 202. In such a linear summation multiplier, multiplier CSA array 200 generates a final sum and carry, which are summed in adder 202. In a preferred embodiment, adder 202 outputs the final result for the multiplication of the operands.

Figure 2C:
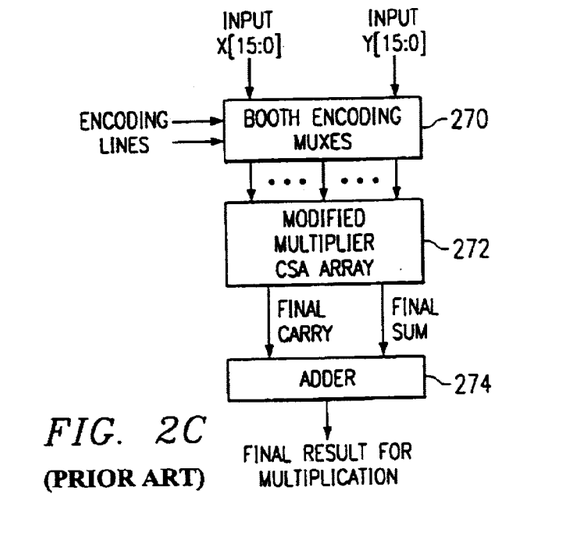
FIG. 2C shows circuitry of a prior art multiplier utilizing the Booth encoding algorithm.

On the other hand, an example of a Booth encoding multiplier is shown in FIG. 2C. FIG. 2C illustrates a 16-bit by 16-bit Booth encoding multiplier that receives two 16-bit operands (shown as X[15:0] and Y[15:0]) and outputs the product of the two operands. The exemplary Booth encoding multiplier of FIG. 2C consists of three components: Booth encoding MUXes 270 to minimize the number of partial product terms, a CSA array 272, and an adder 274 to sum up the final result for the multiplication operation. All three components are implemented with dynamic circuits. For example, to perform 16-bit by 16-bit multiplication (i.e., multiplying two 16-bit operands), a prior art multiplier typically utilizes a dynamic Carry-Save-Adder (CSA) circuitry, such as that of FIG. 2A, with the Booth encoding algorithm. In the Booth encoding dynamic solution of the prior art, 16-bit by 16-bit multiplication results in a multiplier array having six columns of CSA for sign extension (e.g., sign extension 44 of FIG. 1) in addition to the 16 columns of CSA for the partial product elements (e.g., elements 42 of FIG. 1) in the multiplier array, for a total of 22 columns for the entire multiplier array. It should be recognized that the resulting 22 columns of the multiplier array does not correspond to (or "match") the 16-bit input of an operand. This leads to a different layout pitch for the CSA than that for the input circuitry, and results in very complex routing in the layout for input operand signals.

The dynamic multiplier circuitry of the prior art utilizing Booth encoding is problematic for several reasons. First, because the resulting multiplier array results in a greater number of columns than the number of bits in the operands (i.e., because additional to columns are required for sign extension), massive routing complexity is required in the multiplier array. Furthermore, the dynamic circuitry solution of such prior art multipliers consumes an undesirably large amount of power (due to the dynamic circuit and clock) and requires an undesirably rigorous circuit check to ensure that the circuitry functions properly. Also, due to the relatively large number of components required in prior art dynamic multiplier circuitry, such multiplier circuitry consumes an undesirably large amount of surface area and requires an undesirably high cost to be implemented.

Also, another algorithm known as the "Baugh-Wooley" algorithm is well known in the prior art and is commonly implemented in multipliers for performing signed multiplication. The Baugh-Wooley algorithm implementation typically utilizes a linear summation array that results in fewer components and less complexity than multipliers using the Booth encoding algorithm. However, such prior art multipliers implementing a linear summation array utilizing the Baugh-Wooley algorithm only allow for signed multiplication to be performed. Accordingly, such multiplier implementations are severely limited in that they are unable to perform unsigned multiplication.

SUMMARY OF THE INVENTION

In view of the above, a desire exists for a high-speed multiplier that includes a linear summation array for performing both signed and unsigned multiplication. A further desire exists for a multiplier having a static design. Still a further desire exists for a multiplier that reduces the amount of circuitry and routing complexity of prior art multipliers.

These and other objects, features and technical advantages are achieved by a system and method which provide a multiplier comprising a linear summation array that is implemented in a manner that enables both signed and unsigned multiplication to be performed. A preferred embodiment utilizes a modified Baugh-Wooley algorithm to enable an optimum even-and-odd linear summation array for performing both signed and unsigned high speed multiplication. That is, a preferred embodiment enables a linear summation array that is smaller in size and simpler in design than the multiplier arrays typically implemented for signed multiplication in the prior art. For example, suppose 16-bit by 16-bit multiplication is being performed, a preferred embodiment utilizes a linear summation array that is 16 by 14, rather than the prior art multiplier arrays that are typically 22 by 14 because of the additional sign extension columns utilized in prior art designs.

Therefore, the resulting columns of the multiplier array of a preferred embodiment exactly fit into the input pitch of the operands, which dramatically reduces the number of circuitry components required to be implemented for the multiplier array, as well as the complexity of routing within the multiplier array. Additionally, a preferred embodiment implements a static design for performing signed and unsigned multiplication, which further reduces the number of components, complexity, cost, and power consumption of the multiplier. The modified Baugh-Wooley algorithm of a preferred embodiment translates a signed operand to an unsigned operand to greatly simplify the sign extension for multiplication, and to enable a relatively small multiplier array that does not include sign extension columns to be utilized for performing signed multiplication. The modified Baugh-Wooley algorithm of a preferred embodiment also enables the multiplier to perform unsigned multiplication.

It should be appreciated that a technical advantage of one aspect of the present invention is that a multiplier is provided which includes a linear summation array for performing both signed and unsigned multiplication. More specifically, a preferred embodiment utilizes the Baugh-Wooley algorithm to perform both signed and unsigned multiplication. Furthermore, a preferred embodiment provides a static design for performing both signed and unsigned multiplication. A further advantage of one aspect of the present invention is that an even-and-odd structured linear summation is utilized for both signed and unsigned multiplication, which allows for a static structure that is much simpler than the prior art Booth encoding structures for performing signed multiplication. The even-and-odd structured linear summation enables high-speed static multiplier design that is similar to dynamic Booth encoding multiplier speed. Therefore, one advantage of one aspect of the present invention is that it enables a much simpler multiplier design with less area, less cost and less power than is commonly required for prior art multipliers that perform signed and unsigned multiplication. Thus, one advantage of one aspect of the present invention is that a multiplier is disclosed that has a multiplication array that requires less circuitry and less routing complexity than is required for signed multiplication in prior art multipliers. Furthermore, an advantage of one aspect of the present invention is that a static design for a multiplier is disclosed that may reduce the power of the circuitry. For example, the current capacitive load of a preferred embodiment may be reduced by 60 percent or more below that typically required in prior art multipliers due to a smaller and simpler design. Additionally, a further advantage of one aspect of the present invention is that a multiplier is disclosed that may perform high-speed multiplication while providing a multiplier that is smaller, less complex, and more reliable than prior art multipliers. For instance, the multiplier of a most preferred embodiment is operable at a frequency 1 gigahertz or higher.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

A preferred embodiment of the present invention implements an even-and-odd structured linear summation array in a multiplier to perform both signed and unsigned multiplication. As described above, the Booth dynamic circuitry is typically implemented in high-speed (e.g., high frequency CPU) multipliers of the prior art. In a preferred embodiment, the Baugh-Wooley algorithm is utilized in the multiplier, and is implemented in a manner to perform both signed and unsigned multiplication. Additionally, a preferred embodiment results in a multiplier array that corresponds more closely to the size of the operands, which reduces the amount of circuitry required to be implemented and reduces the complexity in performing routing within the multiplier array over typical prior art implementations.

Figure 3A:
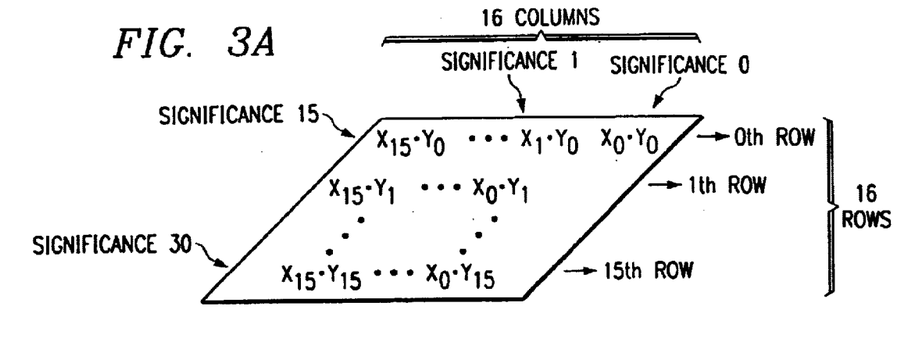
FIG. 3A shows an example of partial products in a multiplier array for 16-bit by 16-bit multiplication
Figure 3B:
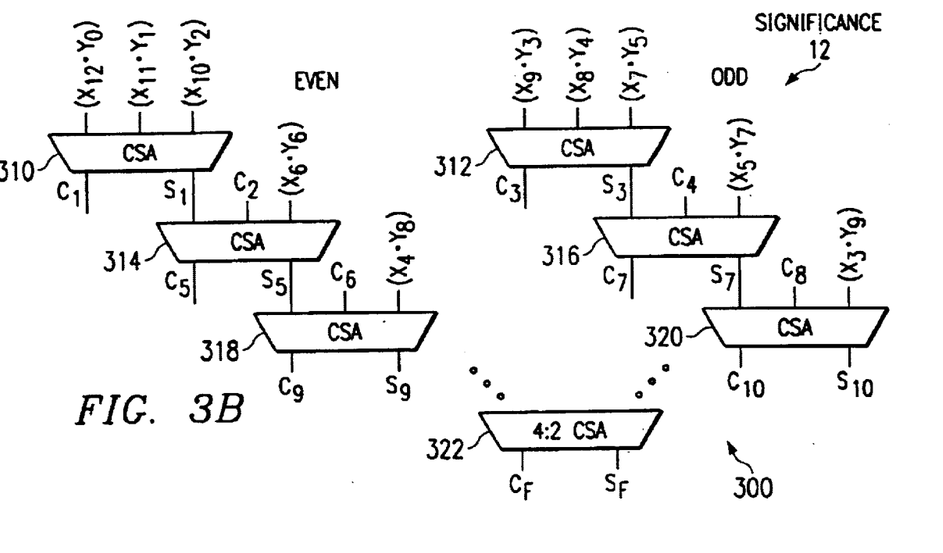
FIG. 3B shows an exemplary CSA array that may be implemented in a preferred embodiment.
Figure 3C:
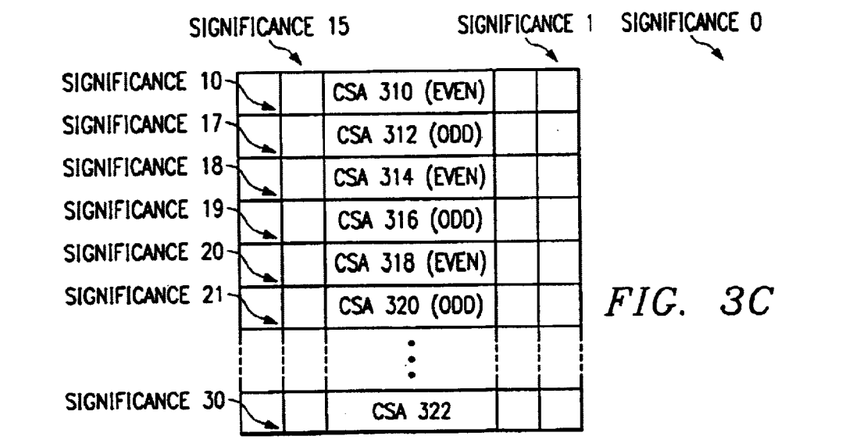
FIG. 3C shows the physical location in layout of the CSA array arrangement of a preferred embodiment.

Turning now to FIGS. 3A and 3B, an exemplary CSA array 300 that may be implemented in a preferred embodiment is described. As an example, suppose multiplication is being performed for two 16-bit operands (i.e., X[15:0] and Y[15:0]). As shown in FIG. 3B, in a most preferred embodiment the partial products of the same significance are input to CSA array 300, of which only a portion is illustrated for simplicity. A most preferred embodiment implements a so-called even-and-odd circuit technique, which is basically a parallel scheme of adding bits of the same significance of the partial products for X*Y. FIG. 3A shows the partial products in order of significance. The partial products in the same vertical column have the same significance. FIG. 3B shows the logic and connections between CSA cells. The even-and-odd structure of a preferred embodiment basically doubles the speed of the linear summation multiplier (i.e., decreases the time required for its operation by half) as compared with the traditional, serial CSA array. FIG. 3C shows the physical location in layout of the CSA array arrangement of a preferred embodiment. The CSA cells in the same significance go 45 degrees from the left-upper to the lower-right diagonal line, and the routing for the connections of the CSA array goes the same direction. This can physically fit the multiplication of 16-bit by 16-bit operands into 16 by 14 CSA cells in layout.

FIG. 3B provides a simple example of an even-and-odd structured linear summation CSA array for significance 12. As shown in FIG. 3B, in 16-bit by 16-bit multiplication (e.g., X[15:0] * Y[15:0]), the first CSA in the even row (shown as CSA 310) takes the first three rows of partial products in significance 12 (i.e., $X_{12}*Y_0$, $X_{11}*Y_1$, and $X_{10}*Y_2$) as three inputs. The second CSA in the layout of FIG. 3B is in the odd row (shown as CSA 312) in logic schematics which takes the next three rows of partial products in significance 12 (i.e., $X_9*Y_3$, $X_8*Y_4$, and $X_7*Y_5$) as three inputs. CSA 310 adds the three inputs to generate a sum $S_1$ and carry $C_1$. Sum $S_1$ is input to CSA 314 along with a carry $C_2$ generated from a CSA of previous significance (i.e., significance 11) and a partial product in the $7^{th}$ row (i.e., $X_6*Y_6$). Likewise, CSA 312 adds three inputs to generate a sum $S_3$ and a carry $C_3$. Sum $S_3$ is input to CSA 316 along with a carry $C_4$ from a CSA of significance 11 in the odd row (physical layout) adding a partial product in the $8^{th}$ row ($X_5*Y_7$). CSA 314 generates a sum $S_5$ and a carry $C_5$. Sum $S_5$ is input to CSA 318 in the even row along with a carry $C_6$ generated from the previous CSA in the even row (i.e., having significance 11), and a new partial product in the $9^{th}$ row (i.e., $X_4*Y_8$). Likewise, CSA 316 (in the odd row) generates a sum $S_7$ and carry $C_7$. Sum $S_7$ is input to CSA 320 (in the odd row) along with a carry $C_8$ generated from the previous odd row (i.e., having significance 11) and a new partial product in the $10^{th}$ row (i.e., $X_3*Y_9$). It should be understood that CSA array 300 comprises further CSAs (not shown) that function in a like manner to add the sums and carries until ultimately a final sum and final carry are added together in a 4:2 CSA 322 to generate a final sum $S_F$ and carry $C_F$. The CSA circuit structure 300 is well-known, and is implemented in a preferred embodiment to enable such preferred embodiment to achieve the desired speed goal with a static circuit design.

Figure 4:
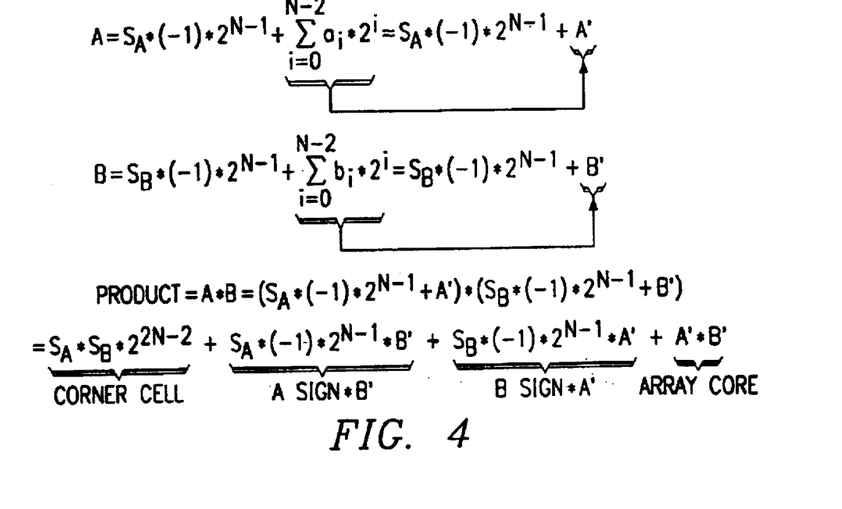
FIG. 4 shows equations for a modified Baugh-Wooley algorithm of a preferred embodiment that enables both signed and unsigned multiplication.

For a description of how the modified Baugh-Wooley algorithm is utilized in a preferred embodiment for signed multiplication, reference is made to the following equations to describe the modified Baugh-Wooley algorithm of a preferred embodiment for signed multiplication of a N-bit operand A and a N-bit operand B, which are also shown in FIG. 4:

$$A = S_A*(-1)*2^{N-1} + \sum_{i=0}^{N-2} a_i*2^i = S_A*(-1)*2^{N-1} + A'$$

$$B = S_B*(-1)*2^{N-1} + \sum_{i=0}^{N-2} b_i*2^i = S_B*(-1)*2^{N-1} + B'$$

$$\text{Product} = A*B = (S_A*(-1)*2^{N-1} + A')*(S_B*(-1)*2^{N-1} + B')$$
$$= S_A*S_B*2^{2N-2} + S_A*(-1)*2^{N-1}*B' + S_B*(-1)*2^{N-1}*A' + A'*B'$$

As shown above, two operands (A and B) are represented in a manner that enables signed multiplication thereof. Operand A is represented by: $S_A*(-1)*2^{N-1}+A'$, where $S_A$ is the sign bit for operand A and N is the number of bits of operand A. A' is the rest of operand A when its sign bit is ignored. As is well known in the art, when an operand's sign bit is 1, the operand is of negative value, and when the operand's sign bit is zero, the operand is of positive value.

Similarly, operand B is represented by: $S_B*(-1)*2^{N-1}+B'$, where $S_B$ is the sign bit for operand B and N is the number of bits of operand B. B' is the rest of the B operand when its sign bit is ignored. In general, the Baugh-Wooley algorithm of a preferred embodiment separates the sign bit of an operand from the rest of the bits, and then multiplies the two operands. More specifically, a 4-part term (or 4-part equation) is generated to determine the product of operands A and B, which is illustrated in FIG. 4. The first part of the term is $S_A*S_B*2^{2N-2}$, which is the corner cell 508 of the multiplier array of a most preferred embodiment shown in FIG. 5. The second part of the term is $(S_A*(-1)*2^{N-1}*B')$, which is the column 504 of the multiplier array of FIG. 5. The third term is $(S_B*(-1)*2^{N-1}*A')$, which is the row 506 of the multiplier array of FIG. 5. The fourth term is (A'*B'), which is the unsigned array core 502 of the multiplier array of FIG. 5.

The second part of the term shown in FIG. 4 (i.e., $S_A*(-1)*2^{N-1}*B'$), translates the operand A from a signed operand to an unsigned operand. That is, if the sign bit of operand A is set to 1 (indicating that it is a negative operand), the operand is inverted. The third part of the term shown in FIG. 4 (i.e., $S_B*(-1)*2^{N-1}*A'$), translates the operand B from a signed operand to an unsigned operand. That is, if the sign bit of operand B is set to 1 (indicating that it is a negative operand), the operand is inverted. As a result, a preferred embodiment implements the Baugh-Wooley algorithm in a manner that translates a signed multiplication into an unsigned multiplication to avoid sign extensions in the multiplier array.

Moreover, a preferred embodiment implements the Baugh-Wooley algorithm in a manner that enables both signed and unsigned multiplication to be performed, without requiring a large multiplier array having sign extensions implemented therein, with a slight modification in the typical AND gate circuitry that generates the partial product for the multiplier CSA array. The modified Baugh-Wooley algorithm of a preferred embodiment for unsigned multiplication of a N-bit operand A and a N-bit operand B is as follows:

$$A = S_A * 2^{N-1} + \sum_{i=0}^{N-2} a_i * 2^i = S_A * 2^{N-1} + A'$$

$$B = S_B * 2^{N-1} + \sum_{i=0}^{N-2} b_i * 2^i = S_B * 2^{N-1} + B'$$

$$\text{Product} = A * B = (S_A * 2^{N-1} + A') * (S_B * 2^{N-1} + B')$$

$$= S_A * S_B * 2^{2N-2} + S_A * 2^{N-1} * B' + S_B * 2^{N-1} * A' + A' * B'$$

Figure 5:
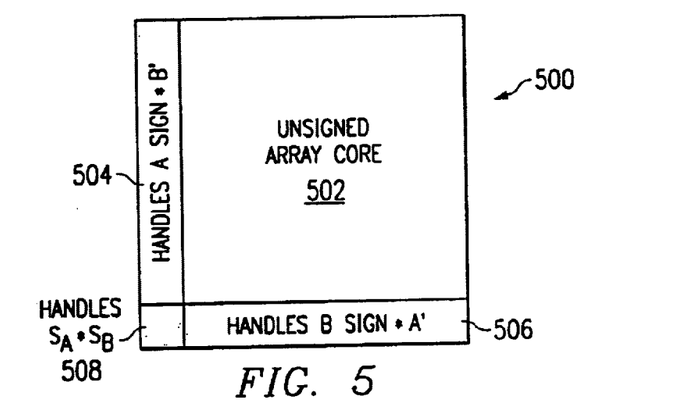
FIG. 5 shows a multiplier array utilized in a preferred embodiment to enable both signed and unsigned multiplication.

As shown in the above equation, the difference between the signed multiplication and the unsigned multiplication of a preferred embodiment is the second and third terms (corresponding with column 504 and row 506 of the multiplier array 500 of FIG. 5). Since there is a sign extension for signed multiplication into the area 508 bit of FIG. 5, when one or both of $S_A$ and $S_B$ is 1 (indicating that one or both input operands are negative), the operands in area 504 and 506 are inverted. That is why bit 508 is equal to $(S_A*S_B)$ for unsigned multiplication, and bit 508 is equal to $(S_A+S_B)$ for signed multiplication (as discussed more fully with reference to FIGS. 6 and 7D).

To enable unsigned multiplication with the same multiplier CSA array implemented in the modified Baugh-Wooley algorithm described above for performing signed multiplication, special circuitry is utilized to manipulate the partial product input to the CSA array of the multiplier, which is discussed in greater detail with reference to FIGS. 7A–7D. The CSA array of a preferred embodiment is implemented to generate a multiplier array 500, as shown in FIG. 5. As shown, multiplier array 500 includes the terms necessary for the algorithm of FIG. 4 for computing the product of two operands A and B. That is, the multiplier array 500 includes the unsigned array core which satisfies the term (A'*B') of the equation of FIG. 4. Also, the multiplier array 500 includes a column 504, which is the left-most column of the multiplier array in a preferred embodiment, that satisfies the term $(S_A*(-1)*2^{N-1}*B')$ of the equation of FIG. 4. Furthermore, the multiplier array 500 includes the bottom row 506 in a preferred embodiment, which satisfies the term $(S_B*(-1)*2^{N-1}*A')$ of the equation of FIG. 4. Additionally, the multiplier array 500 includes a cell, which is the corner bit 508 in a preferred embodiment, which satisfies the term $(S_A*S_B)$ of the equation of FIG. 4.

Figure 7A:
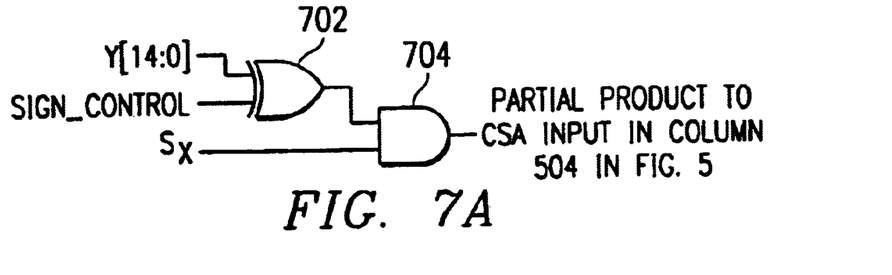
FIG. 7A shows a preferred embodiment for generating partial products to be input to the CSA array in column 504 of the exemplary multiplier array 500 of FIG. 5.
Figure 7B:
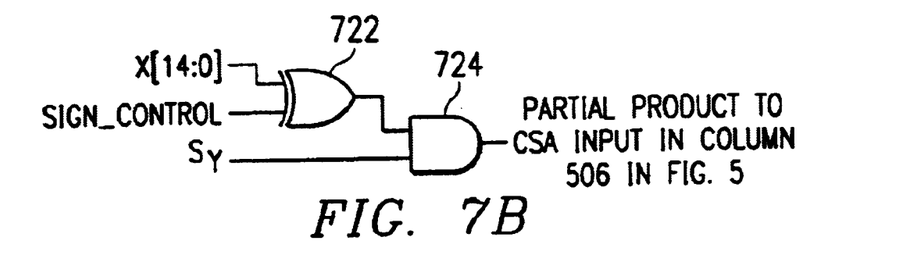
FIG. 7B shows a preferred embodiment for generating partial products to be input to the CSA array in row 506 of the exemplary multiplier array 500 of FIG. 5.

Accordingly, summing these four terms of the equation of FIG. 4 produces the product of the two operands A and B. Therefore, a preferred embodiment provides a multiplier array 500 that may be utilized to perform both signed and unsigned multiplication, wherein unsigned multiplication is enabled by implementing a slight modification to the AND gate circuitry to generate the partial products for areas 504 and 506 of multiplier array 500. The circuit for the areas 504 and 506 CSA partial product input of a preferred embodiment is shown in FIGS. 7A and 7B, which will be described in greater detail hereafter.

Additionally, the multiplier array 500 of a preferred embodiment is relatively smaller than multiplier arrays for performing signed multiplication of the prior art. More specifically, the multiplier array 500 of a preferred embodiment eliminates the requirement of having a sign extension, such as sign extension 44 of array 40 shown in FIG. 1, included within the multiplier array. As a result, the multiplier array matches (or corresponds) more closely to the size of the input operands. For example, if two 16-bit operands are input to the multiplier, the multiplier array of a preferred embodiment is a 16 by 14 array, rather than a 22 by 14 array that is typically required for prior art implementations utilizing Booth encoding for signed multiplication. As a result, the circuitry required for implementing the multiplier array 500 of a preferred embodiment is reduced, thereby reducing the complexity of routing within the multiplier array, surface area consumed by the multiplier array, power consumed by the multiplier array, and cost of implementing the multiplier array.

Figure 6:
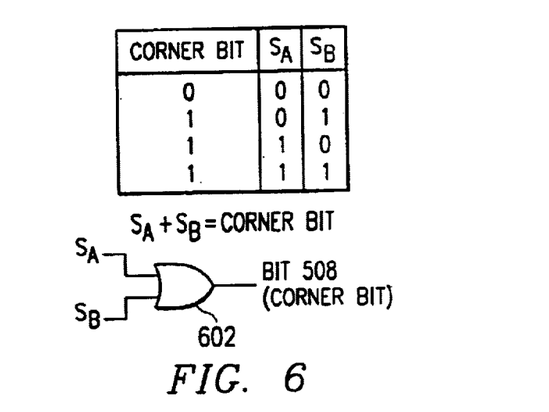
FIG. 6 shows the implementation of corner bit 508 of the multiplier array of FIG. 5 in greater detail.

The operation of the comer bit 508 of multiplier array 500 in a preferred embodiment is illustrated in greater detail in FIG. 6. As shown in FIG. 6, the corner bit 508 is the result of $(S_A+S_B)$ due to the sign extension from areas 504 and 506 when one or both of the input operands (A and B) have negative value, and the input in areas 504 and 506 is inverted accordingly. More specifically, the corner bit 508 is the output of a logical OR 602 having the sign bit of operand A (i.e., $S_A$) and the sign bit of operand B (i.e., $S_B$) input thereto. Therefore, as the table of FIG. 6 illustrates, the corner bit 508 is set high (e.g., a logic 1) if either or both of the sign bits are high, and the comer bit 508 is set low (e.g., a logic 0) if both the sign bits are low.

Figure 7C:
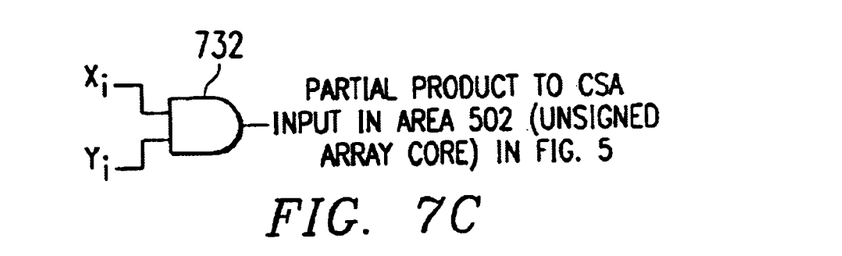
FIG. 7C shows a preferred embodiment for generating partial product to be input to the CSA array of area 502 of the exemplary multiplier array 500 of FIG. 5.
Figure 7D:
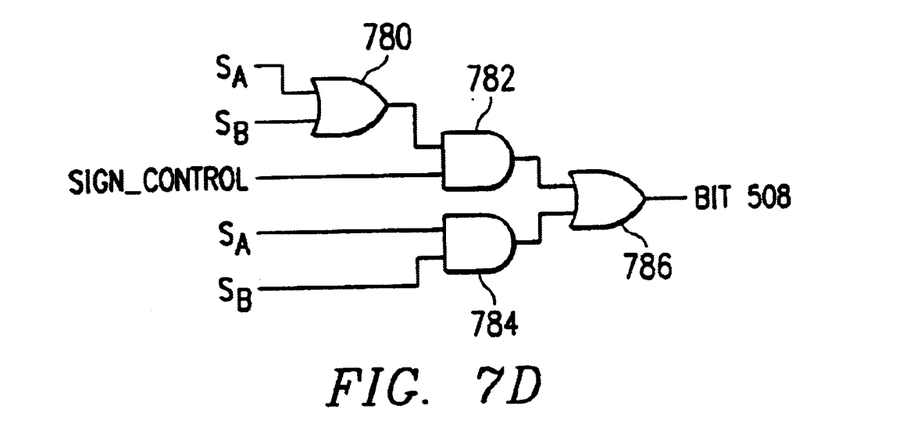
FIG. 7D shows a preferred embodiment for generating the bit of area 508 of the exemplary multiplier array 500 of FIG. 5.

Turning to FIG. 7D, circuitry of a preferred embodiment is shown for generating the bit 508 of the multiplier array of FIG. 500. As shown, $S_A$ and $S_B$ are input to an OR gate 780, the output of which is input to AND gate 782 along with a sign_control bit. Additionally, $S_A$ and $S_B$ are input to AND gate 784. The output of AND gates 782 and 784 are input to OR gate 786, which outputs the corner bit 508 of FIG. 500. Accordingly, bit 508 is equal to $(S_A * S_B)$ for unsigned multiplication and bit 508 is equal to $(S_A + S_B)$ for signed multiplication.

Turning to FIGS. 7A and 7B, a preferred embodiment for generating partial products to be input to the CSA array of areas 504 and 506 of the multiplier array 500 is shown. As discussed above, a preferred embodiment performs unsigned multiplication by manipulating the partial product inputs into the CSA cells in areas 504 and 506. In unsigned multiplication, $S_A$ is not the sign of operand A. Rather, $S_A$ is the most significant bit ("MSB") of operand A. For unsigned multiplication, the equation for area 504 is $(S_A * 2^{N-1} * B')$. In comparison, the equation for area 504 in signed multiplication is $(S_A * (-1) * 2^{N-1} * B')$. In the implementation of unsigned multiplication when $S_A$ is 1, B' is directly input to the CSA cells of area 504, and when $S_A$ is 0, the input to the CSA cells of area 504 is 0. In the implementation of signed multiplication, when $S_A$ is 1 (indicating operand A is negative), B' is inverted to generate the inputs for the CSA cells of area 504, and when $S_A$ is 0 (indicating operand A is positive), the input to the CSA cells of area 504 is 0. This enables the same multiplier array to be used for performing both signed and unsigned multiplication. Accordingly, the modified Baugh-Wooley multiplier for signed multiplication of a preferred embodiment is used to perform unsigned multiplication as well.

A preferred embodiment utilizes a sign-control bit to control the modified Baugh-Wooley multiplier array to perform either signed multiplication or unsigned multiplication. More specifically, when signed multiplication is being performed, the sign_control bit is set to 1 in a preferred embodiment. As shown in FIG. 7A, the sign_control bit input with the rest of the operand into an exclusive-OR (XOR) gate 702. When the sign_control bit is set to 1, signed multiplication is enabled. Accordingly, Y[14:0] is inverted by XOR 702. The inverted Y[14:0] is ANDed with the sign bit of the X operand, $S_X$, and the resulting partial products are input to the CSA of area 504. In this case, the X operand is equivalent to the A operand described above in the modified Baugh-Wooley algorithm (e.g., $S_X = S_A$), and the Y operand is equivalent to the B operand described above in the modified Baugh-Wooley algorithm (e.g., $S_Y = S_B$). When the sign control bit is set to 0, unsigned multiplication is enabled. Accordingly, Y[14:0] is passed over to be ANDed with the sign bit of the X operand, $S_X$, and the resulting partial products are input into the CSA of area 504 for unsigned multiplication.

As further shown in FIG. 7A, the output of XOR gate 702 is input to an AND gate 704 with the sign bit of the X operand (i.e., $S_X$). Accordingly, when signed multiplication is being performed, if $S_X$ is 1 (indicating that X is a negative operand), AND gate 704 logically ANDs the $S_X$ bit with the output of the XOR gate 702, which results in the inverted operand Y[14:0]. That is, when $S_X$ is 1, the result of the AND gate 704 is the inverted operand Y[14:0], which is exactly the desired output for signed multiplication. However, when $S_X$ is 0 (indicating that X is a positive operand), the partial product output by AND gate 704 is 0. Furthermore, when an unsigned operation is being performed, the sign-control bit is set to 0. Therefore, XOR gate 20 passes over the Y[14:0] operand into the input of the AND gate 704. The Sx bit, which is the most significant bit for the X operand, is ANDed with the Y[14:0] operand to result in the partial product of (Sx*Y), which is exactly what is desired for unsigned multiplication.

In FIG. 7B, the circuit for generating the partial product to be input to the CSA array of area 506 of FIG. 5 is shown. As shown, such circuitry is similar to that of FIG. 7A. Likewise, this circuit takes X[14:0] as inputs, along with sign_control bit in the XOR gate 722. The result of the XOR gate 722 is ANDed in AND gate 724 with $S_Y$ (the sign bit of the Y operand) to generate partial products to be used as inputs to the CSA of area 506 of FIG. 5 for signed multiplication and unsigned multiplication, depending on the sign_control bit. As shown in FIG. 7C, AND gates, such as AND gate 732, are used to generate the partial products for the CSA inputs of area 502 of the multiplier array 500 of FIG. 5, the unsigned array core. One advantage of a Baugh-Wooley multiplier of a preferred embodiment is that the unsigned core needs only simple AND gates, such as AND gate 732, to generate the CSA inputs.

For the Baugh-Wooley algorithm of a preferred embodiment, when the sign control bit is 1 (indicating a signed multiplication operation is being performed) then the operands are either being inverted when the sign bit of the other input operand is 1, or being zeroed out when the sign bit of the other input operand is zero, either in the column 504 of multiplier array 500 or the row 506 of multiplier array 500 of FIG. 5. Whenever an operand is inverted, a preferred embodiment adds a one in the bit significance 15. If both operands are inverted, then a preferred embodiment adds two to the bit significance 15, which means that one bit is added to the bit significance 16. A preferred embodiment implements "sticky bits" STY[16:15] to add the appropriate value needed for a signed operation. In a preferred embodiment, STY[16] is equal to $S_A * S_B$ (i.e., $S_A$ AND $S_B$) and STY[15] is equal to $S_A$ XOR $S_B$. Accordingly, STY[15] is high only if one of the sign bits for the operands A and B is high, and STY[16] is high only if both of the operands A and B is high. In a preferred embodiment, the so called sticky bits STY[16:15] are implemented in a workable location within the CSA array, which may be any workable location in various implementations.

As discussed above, in the modified Baugh-Wooley multiplier of a preferred embodiment, the difference between signed multiplication and unsigned multiplication is in areas 504, 506, and 508 of the multiplier array of FIG. 5. The unsigned core (area 502) is the same for signed multiplication and unsigned multiplication. This is one of the advantages of the Baugh-Wooley algorithm of a preferred embodiment. FIGS. 7A and 7B illustrate the manipulation of the partial product input to the areas 504 and 506 to perform both signed and unsigned multiplication in a preferred embodiment. Corner bit 508 is equal to $(S_A + S_B)$ for signed multiplication, and bit 508 is equal to $(S_A * S_B)$ for unsigned multiplication. Thus, to enable both signed and unsigned multiplication, a slight modification to the logic gate to generate bit 508 is utilized in a preferred embodiment, as shown in FIG. 7D.

A multiplier of a preferred embodiment may be utilized in an implementation as disclosed in co-pending and commonly assigned U.S. application Ser. No. 09/510,271 entitled "SYSTEM AND METHOD FOR PERFORMING POPCOUNT USING A MULTIPLIER," the disclosure of which is hereby incorporated herein by reference. Thus, a multiplier of a preferred embodiment may provide a desirable implementation for performing both signed and unsigned multiplication, as well as performing a popcount function for a received operand. For instance, an example technique for implementing popcount functionality in a multiplier is described hereafter in conjunction with FIGS. 11–13, which are also depicted and described in U.S. patent application Ser. No. 09/510,271.

Traditionally, computer processors of the prior art include dedicated circuitry for performing a "popcount" function.

Popcount is the function of counting the number of high bits (i.e., 1's) in an input or output operand. That is, popcount counts the population of 1's in an operand. Popcount is commonly performed for multimedia instructions, for example. Prior art processors commonly include a dedicated circuit for performing popcount. That is, prior art processors typically include stand-alone circuitry that performs popcount as its sole function.

In a preferred embodiment, a popcount generator for generating a count of the number of high bits of an operand is provided, which comprises a multiplier. The multiplier is configured to receive a first operand and a second operand as inputs, and output a popcount for the first operand. In a preferred embodiment, the multiplier is configured to perform both multiplication and popcount. That is, in a preferred embodiment the multiplier is configured to output a product resulting from the multiplication of the operands input to the multiplier, if multiplication is enabled for the multiplier, and the multiplier is configured to output the popcount for the first operand, if popcount is enabled for the multiplier.

In a preferred embodiment, a popcount control signal is utilized to enable the multiplier to perform either multiplication or popcount. For example, when the popcount control signal is high, the multiplier may perform popcount, and when the popcount control signal is low, the multiplier may perform multiplication. In a preferred embodiment, the multiplier comprises a multiplier array. Furthermore, in a preferred embodiment very little circuitry is added to an existing multiplier to enable the multiplier to perform both multiplication and popcount, thereby eliminating the requirement of a dedicated circuit for performing popcount. In a preferred embodiment, the multiplier's circuitry for implementing the "all-inclusive" diagonal of the multiplier array, which includes every bit of the first operand (i.e., the operand for which popcount is desired when popcount is enabled), is configured to output each bit of such first operand as a partial product when popcount is enabled. Furthermore, in a preferred embodiment, the multiplier's circuitry for implementing the all-inclusive diagonal of the multiplier array is configured to output the appropriate product of the elements of such all-inclusive diagonal as a partial product when popcount is not enabled (meaning that multiplication is enabled). That is, when popcount is not enabled the circuitry for the all-inclusive diagonal of the multiplier array produces the appropriate partial products for the respective bits of the first and second operands included within the all-inclusive diagonal, as is desired for performing multiplication. The circuitry for implementing the remaining portions of the multiplier array is as commonly implemented for such multiplier, in a preferred embodiment.

Additionally, in a preferred embodiment, when popcount is enabled for the multiplier, each bit of the second operand is set to 0. Accordingly, because the second operand is set to 0, the resulting partial product for every element of the multiplier array is 0, except for those elements of the all-inclusive diagonal of the multiplier array. Therefore, when popcount is enabled for a preferred embodiment, the resulting partial products from the multiplier array are all 0, except for those partial products of the all-inclusive diagonal of the multiplier array, which correspond to each bit of the first operand. Thus, when the partial products of the multiplier array are input to the CSA array of the multiplier, the output results in the correct popcount for the first operand (i.e., the operand for which popcount is desired when popcount is enabled). On the other hand, when popcount is not enabled, the appropriate partial products of the multiplier array for multiplication of the first and second operands input to the multiplier are generated. Accordingly, when such partial products are input to the CSA array of the multiplier, the output of the multiplier results in the correct product resulting from the multiplication of the first and second input operands, when popcount is not enabled for the multiplier.

Figure 11:
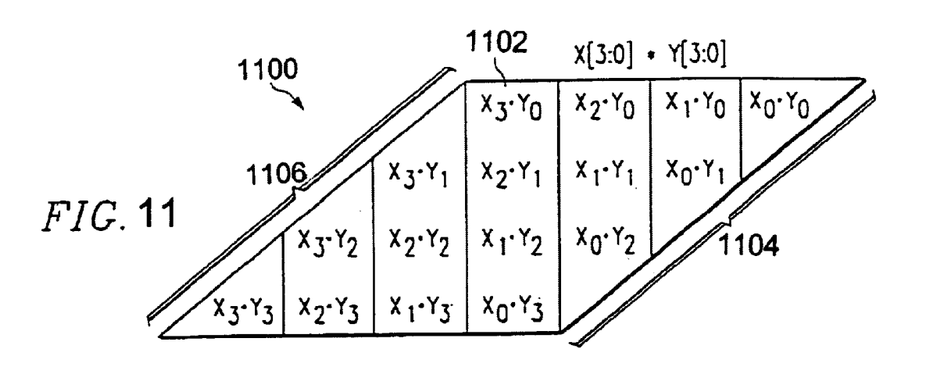
FIG. 11 shows an exemplary multiplier array that results from the multiplication of operands X[3:0] and Y[3:0]

To understand the popcount algorithm utilized in a multiplier for a preferred embodiment, attention is directed to FIG. 11. Shown in FIG. 11 is a multiplier array 1100 that results from the multiplication of operands X[3:0] and Y[3:0]. Assume that popcount is desired for operand X[3:0]. It will be recognized from multiplier array 1100 that area 1102 (i.e., the diagonal of multiplier array 1100) includes all of the bits X[3:0], i.e., bits X[0], X[1], X[2], and X[3]. Accordingly, if the bits for operand Y[3:0] contained in area 1102 of multiplier array 1100 were ignored (meaning $X_3*Y_0=X_3$, $X_2*Y_1=X_2$, $X_1*Y_2=X_1$, and $X_0*Y_3=X_0$), then area 110 may be utilized to perform popcount for operand X[3:0]. That is, by summing all of the bits of the X[3:0] operand found on the diagonal 1102 of multiplier 1100, while ignoring the Y[3:0] operand, popcount can be accomplished for the X[3:0] operand. Thus, areas 1104 and 1106 of the multiplier array 1100 may be set to zero (e.g., by setting Y[3:0] operand to be zero), and the bits for operand X[3:0] found in the diagonal 1102 may be utilized to perform popcount for operand X[3:0], ignoring the bits for the Y[3:0] operand found in the diagonal 1102. In this manner, the multiplier array 1100 for an existing multiplier found within a processor may be utilized to accomplish popcount.

As shown in FIG. 11, it will be understood that area 1102 of the multiplier array 1100 is the diagonal of the multiplier array 1100, which includes all of the bits of the operand X[3:0]. Accordingly, when summing all of the bits for the X[3:0] operand found in the diagonal 1102 of the multiplier array 1100 and ignoring the bits for the Y[3:0] operand found in the diagonal 1102, the popcount result for the X[3:0] operand is obtained. Thus, the diagonal 1102 of the multiplier array 1100 may be referred to as an "all-inclusive diagonal" of multiplier array 1100 because such diagonal 11-2 includes all bits of the operand for which popcount is desired (i.e., operand X[3:0]).

Figure 12:
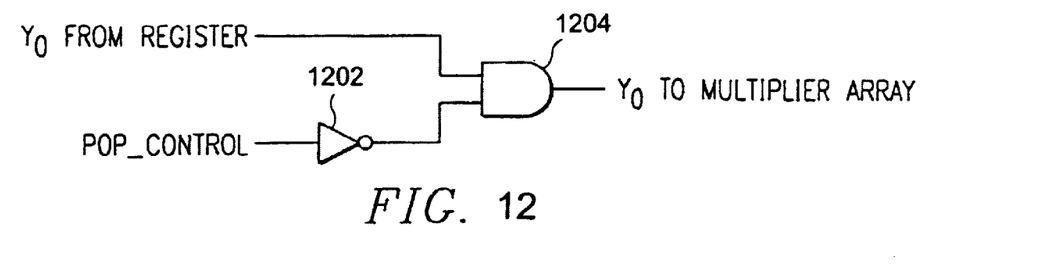
FIG. 12 shows exemplary circuitry that may be implemented for generating the appropriate values to be input to the multiplier array for bits of a Y operand in a preferred embodiment.

A preferred embodiment utilizes a multiplier to not only perform multiplication, but also to accomplish popcount for an operand. Suppose for example, that popcount is desired for operand X[3:0]. Operand X[3:0] may be input to the multiplier along with operand Y[3:0], wherein each bit of operand Y[3:0] is set to 0. A variety of techniques may be utilized to set operand Y[3:0] to 0. One technique that may be implemented in a preferred embodiment is to read operand Y[3:0] from a special register, which sets Y[3:0] to 0, when popcount is being performed. Another technique that may be implemented in a preferred embodiment is to set Y[3:0] to input into the multiplier array to zero when popcount is being performed in the manner as shown in FIG. 12. In the exemplary implementation of FIG. 12, bit $Y_0$ of operand Y is input from its register to an AND gate 1204. A pop_control signal input to an inverter 1202, the output of which is input to AND gate 1204. Thus, when pop_control is a high voltage level, meaning that popcount is enabled, the high voltage value is inverted by inverter 1202 resulting in a low voltage value being input to the AND gate 1204. Accordingly, the value for $Y_0$ output by AND gate 1204 is a 0 (low voltage value), which is desired when popcount is being performed for the X operand. On the other hand, when pop_control is a low voltage level, meaning that multiplication is enabled for the multiplier, the low voltage value is inverted by inverter 1202 resulting in a high voltage level being input to the AND gate 1204. Accordingly, the value of $Y_0$ from its register will be passed as the output of AND gate 1204, which is desired when multiplication is being performed. It should be recognized that any other technique for generating the Y[3:0] operand having a 0 value may be implemented in a preferred embodiment, and any such implementation is intended to be within the scope of the present invention. Accordingly, the multiplier will result in a multiplier array 1100, as shown in FIG. 11. Because each bit of operand Y[3:0] is 0 when popcount is being performed, each partial product of the multiplier array 1100 in areas 1104 and 1106 will be 0. Thus, each partial product of areas 1106 and 1106 of the multiplier array 1100 are zeroed out as a bit of the X operand is ANDed with a bit of the Y operand having value 0. As discussed above, having areas 1104 and 1106 of the multiplier array 1100 zeroed out is desirable when performing popcount. However, for the diagonal 1102 of the multiplier array 1100, the values of the Y[3:0] operands contained therein must be disregarded in a manner that allows the number of 1's in the X[3:0] operand of the diagonal 1102 to be counted. In a preferred embodiment, additional circuitry is added to an existing multiplier to allow the multiplier to accomplish this task (i.e., counting the number of 1's in the X[3:0] operand contained in the diagonal 1102 of the multiplier array 1100), as discussed more fully below in conjunction with FIG. 13.

Figure 13:
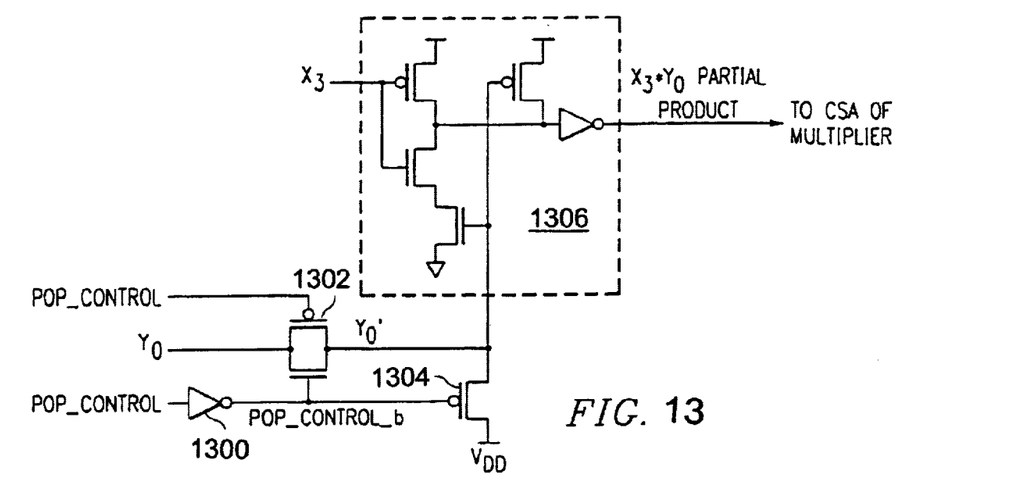
FIG. 13 shows a preferred embodiment of the present invention for implementing partial product circuitry that produces inputs to a CSA in the all-inclusive diagonal of a multiplier to perform both multiplication and popcount.

In a preferred embodiment, very little circuitry is added to an existing multiplier to allow the multiplier to perform both multiplication and popcount. Turning to FIG. 13, a preferred embodiment for implementing a multiplier to perform both multiplication and popcount is shown. More specifically, FIG. 13 illustrates the circuitry implemented for generating partial products of the diagonal 1100 of multiplier array 1100, which allows the multiplier to perform both multiplication and popcount, in a preferred embodiment. That is, in a preferred embodiment, the circuitry implementation illustrated in FIG. 13 need only be implemented for the portion of a multiplier that functions to generate the partial products of the diagonal 1102 of the multiplier array 1100, and the remainder of the multiplier circuitry that is utilized to generate the partial products of areas 1104 and 1106 of the multiplier array 1100 as is commonly implemented for such multiplier. Thus, in a preferred embodiment, only the circuitry for producing the partial products of diagonal 1102 of the multiplier array 40 are implemented as shown in FIG. 13, and the remainder of the multiplier circuitry is unchanged. In a preferred embodiment, an inverter 1300, pass gate 1302, and P-channel field effect transistor (PFET) 1304 are added to the existing multiplier circuitry that functions to produce the partial products of diagonal 1102 of the multiplier array 1100 (AND gate for the partial product) to enable the multiplier to be utilized for both multiplication and popcount.

As shown in FIG. 13, a popcount control bit (shown as pop_control) is provided to indicate whether popcount is being performed (i.e., whether popcount is enabled for the multiplier). For example, when the pop_control bit is high (1), popcount is enabled for the multiplier, and when the pop_control bit is low (0), multiplication is enabled for the multiplier. To better illustrate operation of a preferred embodiment, suppose that popcount is desired for operand X[3:0]. In a preferred embodiment, operands X[3:0] and Y[3:0] are input to the multiplier, wherein each bit of operand Y[3:0] is set to 0. Accordingly, as discussed above, the partial products of areas 1104 and 1106 of multiplier array 1100 are 0, as a bit of operand X[3:0] is ANDed with a bit of operand Y[3:0] having value 0.

In a preferred embodiment, the portion of the multiplier's circuitry for generating the partial products of the diagonal 1102 of multiplier array 1100 is implemented as shown in FIG. 13. FIG. 13 illustrates an example of generating the partial product for the element $X_3*Y_0$ of the diagonal 1102 of multiplier array 1100. As shown, operand $Y_0$ is input to pass gate 1302, and the pop_control bit is fed to pass gate 1302 to control the gate's operation. Node $Y_0$ is output from pass gate 1302 and fed to the AND gate 1306 along with the $X_3$ operand. Therefore, the AND gate 1306 outputs the partial product $X_3*Y_0$, which is then fed to the multiplier's CSA (not shown) for summing, as is commonly performed within such multiplier.

Because popcount is enabled for the multiplier, the pop_control bit is set high (1) and each bit of the Y[3:0] operand is set to 0. Because the pop_control bit is high (1), the pass gate 1302 is cut off. Additionally, the pop_control bit is fed through inverter 1300 resulting in pop_control_b, which is then fed to PFET 34, as shown in FIG. 13. Thus, when pop_control is high (1) (meaning that popcount is enabled), pop_control_b is low (0), which turns on the PFET 1304 that is connected to VDD. Thus, node $Y_0$ of FIG. 13 is pulled up to a high voltage value (1) when popcount is enabled. Thereafter, Node $Y_0$ having a high value (1) is fed to AND gate 1306 along with operand $X_3$, which causes AND gate 1306 to output the value of $X_3$ as the partial product and $Y_0$ is ignored and has no effect on the partial product in the diagonal area 1102 in the multiplier array 1100. Circuitry for generating the partial product for the other elements of the diagonal 1102 of multiplier array 1100 is implemented in a like manner. Accordingly, when popcount is enabled, only the values of the X[3:0] operand are passed to the multiplier's CSA array to be summed. That is, because areas 1104 and 1106 of the multiplier array are zeroed and the circuitry of FIG. 13 functions to pass each bit of operand X[3:0] found in the diagonal 1102 of multiplier array 1100 to the multiplier's CSA array when popcount is enabled, the results of such CSA array are summed to produce the final product that is the popcount of operand X[3:0]. Therefore, the output of the multiplier is the popcount for operand X[3:0] when popcount is enabled.

Suppose now that operands X[3:0] and Y[3:0] are input to the multiplier and popcount is not enabled for the multiplier (meaning that multiplication is enabled). Thus, operands X[3:0] and Y[3:0] are to be multiplied together, and the multiplier is to output the resulting product. Again, the multiplier will produce the multiplier array 1100, as shown in FIG. 11. Of course, when multiplication is enabled for the multiplier, the circuitry for generating the partial products of areas 1104 and 1106 function as is common for such multiplier because such circuitry of the multiplier is unchanged, in a preferred embodiment. Therefore, the multiplier will generate the appropriate partial product for each element of areas 1104 and 1106 of the multiplier array 1100 and input the generated partial products to the multiplier's CSA array, as is commonly performed for such multiplier.

However, now that multiplication is enabled for the multiplier, the circuitry for generating the partial products of the elements of the diagonal 1102 of the multiplier array 1100 must generate the appropriate partial products for the elements, rather than passing the value of the X[3:0] operand to the CSA array as with popcount. As discussed above, FIG. 13 illustrates an example of generating the partial product for the element $X_3*Y_0$ of the diagonal 1102 of multiplier array 1100. As shown, operand $Y_0$ is input to pass gate 1302, and the pop_control bit is fed to pass gate 1302 to control the gate's operation. Node $Y_0$,is output from pass gate 1302 and fed to the AND gate 1306 along with the $X_3$ operand. Therefore, the AND gate 1306 outputs the partial product $X_3*Y_0$, which is then fed to the multiplier's CSA (not shown) for summing, as is commonly performed within such multiplier.

Because popcount is not enabled for the multiplier, the pop_control bit is set low (0), which turns the pass gate 1302 on. Additionally, the pop-control bit is fed through inverter 1300 resulting in pop_control_b, which is then fed to PFET 1304, as shown in FIG. 13. Thus, when pop_control is low (0) (meaning that popcount is not enabled), pop_control_b is high (1), which cuts off the pull-up PFET 34. Thus, the value for $Y_0$ is passed through the pass gate 1302 to node $Y_0$,when popcount is disabled. That is, node $Y_0$,has value $Y_0$ when popcount is not enabled. Thereafter, node $Y_0$,having value $Y_0$ is fed to AND gate 1306 along with operand $X_3$, which causes AND gate 1306 to output the partial product of $X_3*Y_0$, which is the appropriate action for multiplication. Circuitry for generating the partial product for the other elements of the diagonal 1102 of multiplier array 1100 is implemented in a like manner. Accordingly, when popcount is not enabled (meaning that multiplication is enabled), the appropriate partial products of the diagonal 1102 of multiplier array 40 are passed to the multiplier's CSA array to be summed. Therefore, the output of the multiplier is the product of operands X[3:0] and Y[3:0] when popcount is not enabled.

Even though operation of a preferred embodiment has been discussed above with reference to two 4-bit operands (X[3:0] and Y[3:0]), it should be understood that a preferred embodiment is not intended to be limited only to 4×4 multiplication, but may be implemented for any size multiplication (i.e., any N×N multiplication). In a most preferred embodiment, the multiplier is utilized for 16×16 multiplication, as well as 16-bit popcount. Additionally, a preferred embodiment has been described above wherein popcount is enabled upon a pop control bit being set to a high value (1). However, it will be recognized by one of ordinary skill in the art that alternative embodiments may be implemented in a similar manner such that popcount is enabled upon the pop control bit being set to a low value (0), and any such embodiment is intended to be within the scope of the present invention.

Thus, a preferred embodiment utilizes an existing multiplier to perform both multiplication and popcount, thereby eliminating the dedicated circuitry typically required within a processor of the prior art for performing popcount. As a result, fewer components and less circuitry is required for the processor design, thereby resulting in reduced cost, reduced area consumption for the design, reduced power consumption, and reduced complexity of the design as well as lower research and development costs and faster time to market for the resulting processor design. Additionally, a preferred embodiment results in an increase in processor efficiency in that it allows faster scheduling to be accomplished when the processor performs popcount.

Figure 8:
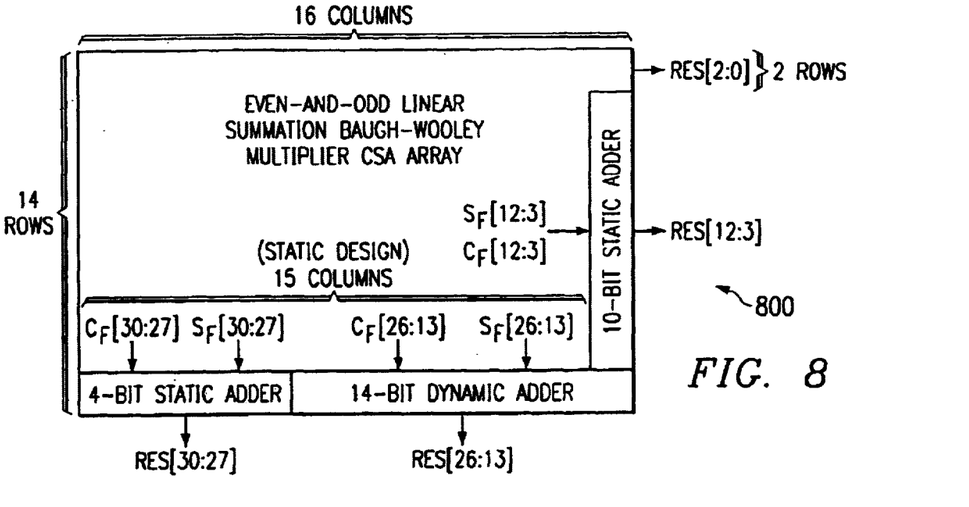
FIG. 8 shows an exemplary overview of the actual physical implementation of the multiplier of a preferred embodiment.

FIG. 8 shows an overview of the multiplier unit 800 of a preferred embodiment. In a preferred embodiment the multiplier unit is implemented in an IA64 microprocessor multimedia unit (MMU). Furthermore, in a preferred embodiment, the multiplier unit 800 has a two clock-cycle operation, meaning that the multiplier unit takes two clock-cycles to perform the necessary instructions from receiving two input operands to computing the results for the instructions (including manipulating the partial products for the inputs to the multiplier CSA array for signed/unsigned multiplication, adding the final sum and final carry for the CSA array to generate the final multiplication result (e.g., res[31:0]), shifting the result with a shifter according to the multiplier unit's instructions, then drive the shifted result into the bypass network and feedback this shifted result into the MMU pipe, which is one of the 6 MMU functional units implemented in a most preferred embodiment. In fact, in a most preferred embodiment the MMU is a two-cycle operation unit.

FIG. 8 shows an overview of the actual physical implementation of the multiplier of a preferred embodiment (utilizing the even-and-odd linear summation Baugh-Wooley multiplier CSA array, as described herein above). As described above, the CSA array takes the modified partial products from the circuits shown in FIGS. 7A, 7B, 7C, and 7D to generate a final sum and final carry. The first row of the CSAs array in FIG. 8 has the significance 16 to significance 1 (from left to right). The first row of CSAs in FIG. 8 adds the first three rows (i.e., $0^{th}$ row to $2^{nd}$ row) of partial products in FIG. 3A. The second row of the CSAs array in FIG. 8 has the significance 16 to significance 2 (from left to right). This second row of CSAs in FIG. 8 adds the second three rows (i.e., from the $3^{rd}$ row to the $5^{th}$ row) of partial products in FIG. 3A. It should be understood that the CSA array of a preferred embodiment is a static design.

The first two rows of CSAs in FIG. 8 have 16 columns of CSAs. It is 16 by 2. From the 3rd row to the $14^{th}$ row, there are only 15 columns of CSAs. It is 15 by 12. A 10-bit static adder is used to add the sum $S_F[12:3]$ and carry $C_F[12:3]$ to generate res[12:3]. $S_F[30:0]$ is the final sum from the CSA array, and CF[30:0] is the final carry from the CSA array. The CSA array generates res[2:0] directly, without the adder's help in a preferred embodiment. Res[30:0] is the final result from the multiplier (the CSA array and the adders). The bits res[2:0], $S_F[12:3]$, and $C_F[12:3]$ come out of the right edge of the multiplier CSA array of a preferred embodiment shown in FIG. 8. $S_F[12:3]$ and $C_F[12:3]$ are inputs to the 10-bit static adder that generates res[12:3]. The 10-bit adder is physically fixed into the right edge column of the CSA area of a preferred embodiment. The bits $S_F[30:13]$ and $C_F[30:13]$ come out of the bottom of the CSA array of a preferred embodiment shown in FIG. 8. The 10-bit static adder is the carry-propagate sum-select adder, which is well-known in the art.

Since the bit $S_F[12:3]$ and $C_F[12:3]$ are generated earlier than $C_F[26:13]$ and (because in a preferred embodiment $S_F[3]$ and $C_F[3]$ are generated, then $S_F[4]$ and $C_F[4]$, an so on), the bit res[12:3] is generated at the same time as $C_F[26:13]$ and $S_F[26:13]$ in a preferred embodiment, which is when the first clock cycle is ended. $C_F[30:27]$ and $S_F[30:27]$ are input to the 4-bit static adder which is located below the CSA array shown in FIG. 8. The bits res[30:27] are generated at the same time when res[12:3] and $C_F[26:13]$ and $S_F[26:13]$ are generated. So, by the end of the first clock cycle, the results of res[30:27], $C_F[26:13]$, $S_F[26:13]$, and res[12:0] are obtained.

In the beginning of the second clock cycle, the 14-bit dynamic adder adds $C_F[26:13]$ and $S_F[26:13]$ to generate res[26:13]. The 14-bit dynamic adder is located below the CSA array as shown in FIG. 8. The multiplication result res[30:27] is fed into the shifter in the multiplier unit 800 (not shown) to generate the final result of the unit according to parallel multiplier instructions (PMUL instructions).

Figure 9:
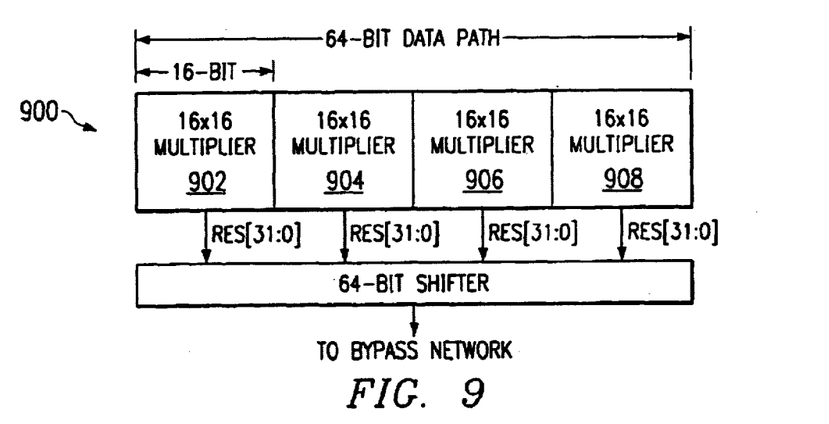
FIG. 9 shows an exemplary implementation of four 16 by 16 multiplier arrays in parallel in the multiplier of a most preferred embodiment.
Figure 10:
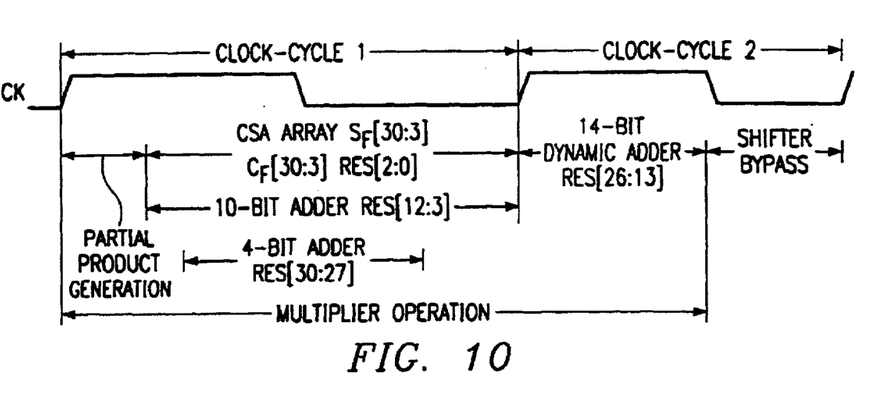
FIG. 10 shows an exemplary timing diagram of a two-clock cycle multiplier of a most preferred embodiment.

As shown in FIG. 9, there are four 16 by 16 multiplier arrays (shown as arrays 902, 904, 906, and 908) in parallel in the PMUL multiplier 900 of a most preferred embodiment for a 64-bit data path and 64-bit input operands (e.g., A[63:0] and B[63:0]). There are latches in the first clock cycle to latch res[30:27], $S_F$[26:13], $C_F$[26:13], and res [12:0] in embodiment. Additionally, FIG. 10 provides an exemplary timing diagram of the two-cycle multiplier CSA array and adders of a most preferred embodiment. As shown, the partial product generation, and generation of $S_F$[30:3], $C_F$[30:3], res[2:0], res[12:3] (i.e., the 10-bit adder), and res[30:27] (i.e., result of 4-bit adder) is completed by the end of the first clock cycle. As further shown, the res[26:13] (i.e., result of 14-bit dynamic adder) and shifting the results and driving the results to the bypass network are accomplished in the second clock cycle in a most preferred embodiment.

In view of the above, a preferred embodiment provides a static design that implements an even-and-odd structured linear summation array to perform both signed and unsigned multiplication. More specifically, a preferred embodiment utilizes a modified Baugh-Wooley algorithm to perform both signed and unsigned multiplication. One advantage of using the even-and-odd structured linear summation for both signed and unsigned multiplication is that it allows for a static structure that is much simpler than the prior art Booth encoding structures that include a MUXing function having more complexity than a preferred embodiment. Therefore, a preferred embodiment enables a much simpler design with less area, less cost and less power than is commonly required for prior art multipliers that perform signed and unsigned multiplication. Thus, a preferred embodiment provides a multiplier having a multiplication array that requires less circuitry and less routing complexity than is required for signed multiplication in prior art multipliers. For example, in a preferred embodiment, performing 16-bit by 16-bit multiplication results in a 16 by 14 multiplication array, instead of the 22 by 14 multiplication array required in multipliers using Booth encoding for signed multiplication. Accordingly, the 16 columns of the resulting multiplier array exactly fits into the input circuit (such as MWXes that generate inputs for multiplication) data path size in layout and in silicon (or the "input pitch") of the operands.

Additionally, a preferred embodiment results in a multiplier that performs multiplication at least as fast as prior art high-speed multipliers, while providing a simpler, smaller, and more reliable multiplier having a static design. For instance, the multiplier of a most preferred embodiment is operable at a frequency 1 gigahertz or higher. Furthermore, a preferred embodiment utilizes an even and odd circuitry implementation in the CSA array to further enhance the speed of performing multiplication. Further still, a preferred embodiment provides a static design that may reduce the power of the circuitry. For example, the current capacitive load of a preferred embodiment may be reduced by 60 percent or more below that typically required in prior art multipliers. Also, a preferred embodiment requires no clock scheme that is commonly present in prior art Booth dynamic multipliers. Additionally, a preferred embodiment requires much less rigorous check during manufacturing of the circuitry as compared with the prior art multipliers.

It should be understood that a preferred embodiment may be implemented within a processor that is utilized for a computer system, such as a personal computer (PC), laptop computer, or personal data assistant (e.g., a palmtop PC). Of course, it should be understood that the present invention is intended to encompass any other type of device in which a multiplier may be implemented, as well.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A multiplier operable to perform both signed and unsigned multiplication, said multiplier comprising:

a multiplier array that includes an unsigned array portion for computing partial products of operands A and B excluding the most significant bits of such operands A and B, a second portion for computing $(S_A*2^{N-1}*B')$ for unsigned multiplication and for computing $(S_A*(-1)*2^{N-1}*B')$ for signed multiplication, a third portion for computing $(S_B*2^{N-1}*A')$ for unsigned multiplication and for computing $(S_B*(-1)*2^{N-1}*A')$ for signed multiplication, and a fourth portion for computing $S_A*S_B$ for unsigned multiplication and for computing $S_A+S_B$ for signed multiplication, wherein N is the number of bits in each operand, $S_A$ is the most significant bit for operand A, $S_B$ is the most significant bit for operand B, A' is the bits of operand A excluding its most significant bit, and B' is the bits of operand B excluding its most significant bit.

2. The multiplier of claim 1 wherein the most significant bit of operand A is its sign extension when operand A is a signed operand, and wherein the most significant bit of operand B is its sign extension when operand B is a signed operand.

3. The multiplier of claim 1 wherein the second portion of said multiplier array comprises:

circuitry implementing an exclusive OR gate that receives as input the bits of B' and a control signal that identifies whether signed or unsigned multiplication is to be performed; and circuitry implementing an AND gate that receives as input the output of the exclusive OR gate and $S_A$.

4. The multiplier of claim 1 wherein the third portion of said multiplier array comprises:

circuitry implementing an exclusive OR gate that receives as input the bits of A' and a control signal that identifies whether signed or unsigned multiplication is to be performed; and circuitry implementing an AND gate that receives as input the output of the exclusive OR gate and $S_B$.

5. The multiplier of claim 1 wherein the fourth portion of said multiplier array comprises:
   circuitry implementing a first OR gate that receives as input $S_A$ and $S_B$;
   circuitry implementing a first AND gate that receives as input the output of said first OR gate and a control signal that identifies whether signed or unsigned multiplication is to be performed;
   circuitry implementing a second AND gate that receives as input $S_A$ and $S_B$; and
   circuitry implementing a second OR gate that receives as input the output of the first AND gate and the output of the second AND gate.

* * * * *